United States Patent [19]

Lee

[11] Patent Number: 4,731,772
[45] Date of Patent: Mar. 15, 1988

[54] OPTICAL HEAD USING HOLOGRAM LENS FOR BOTH BEAM SPLITTING AND FOCUS ERROR DETECTION FUNCTIONS

[76] Inventor: Wai-Hon Lee, 10332 Noel Ave., Cupertino, Calif. 95014

[21] Appl. No.: 860,154

[22] Filed: May 6, 1986

[51] Int. Cl.⁴ .................................................. G11B 7/12
[52] U.S. Cl. ....................................... 369/45; 369/46; 369/112; 350/3.72
[58] Field of Search ................... 369/44, 45, 46, 103, 369/112, 109, 122; 350/3.73, 3.7, 3.72, 3.71

[56] References Cited

U.S. PATENT DOCUMENTS

| | | | |
|---|---|---|---|
| 4,253,723 | 3/1981 | Kojima et al. | 369/103 |
| 4,458,980 | 7/1984 | Ohki | 369/112 |
| 4,624,526 | 11/1986 | Tsukai et al. | 369/109 |
| 4,626,679 | 12/1986 | Kawayama et al. | 369/44 |

FOREIGN PATENT DOCUMENTS 56-47933  4/1981  Japan .................................. 369/112

OTHER PUBLICATIONS

G. L. Rogers, "Artificial Holograms and Astigmatism", Proceedings of the Royal Society of Edinburg, vol. LXIII-Part IV (No. 22), 1952.
Yu. S. Mosyakin and G. V. Skrotskii, "Use of Holograms as Optical Elements" (review). Soviet Journal of Quantum Electronics, vol. 2, No. 3, pp. 199-206, 1972.
Wai-Hon Lee, "Binary Synthetic Holograms", Appl. Opt., vol. 13, pp. 1677-1682, 1972.
O. Bryngdahl, "Computer-Generated Holograms as Generalized Optical Components", Optical Engineering, vol. 14, No. 5, pp. 426-435, 1975.

Primary Examiner—Donald McElheny, Jr.
Attorney, Agent, or Firm—Townsend and Townsend

[57] ABSTRACT

An improved optical head which eliminates the need for a biprism or cylindrical lens for focus detection and allows the placement of a photodetector immediately adjacent to the semiconductor laser to reduce alignment problems and vibrational errors. A semiconductor laser is provided which produces a laser beam which impinges upon a movable objective lens. The objective lens focuses the laser beam onto an information medium. A diffraction grating, which may be holographic, is placed between the laser and the objective lens. The diffracted beams on the forward path from the laser to the objective lens are not used, but on the return path, one of the diffracted beams is focused onto a photodetector which is in the same plane as the semiconductor laser.

12 Claims, 19 Drawing Figures

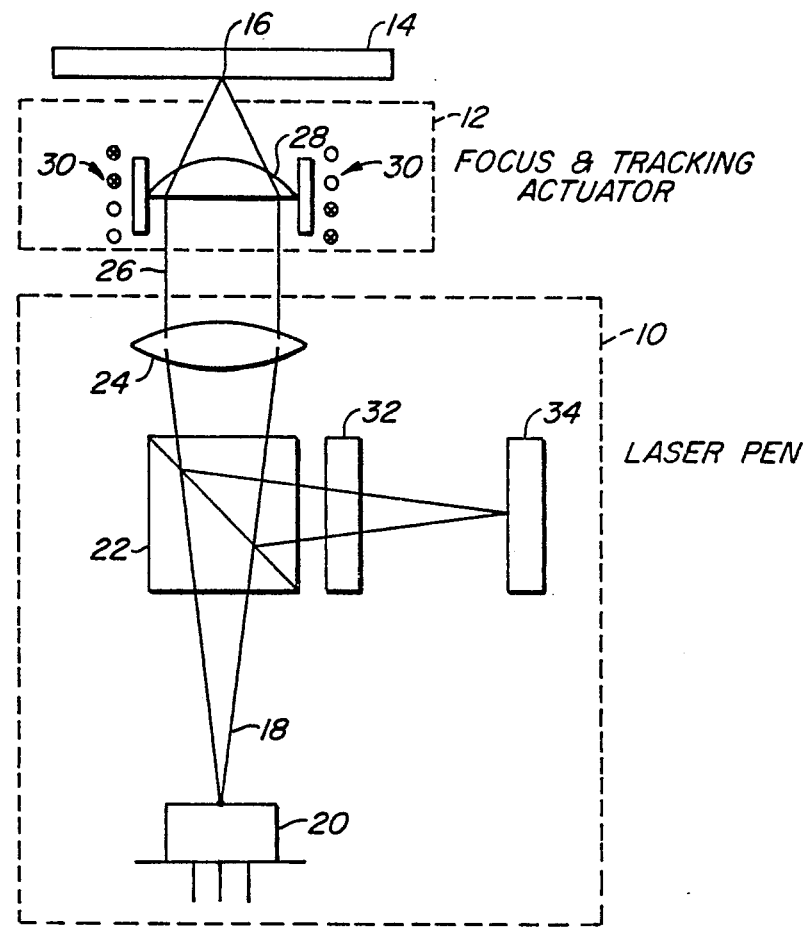
FIG._1. (PRIOR ART)

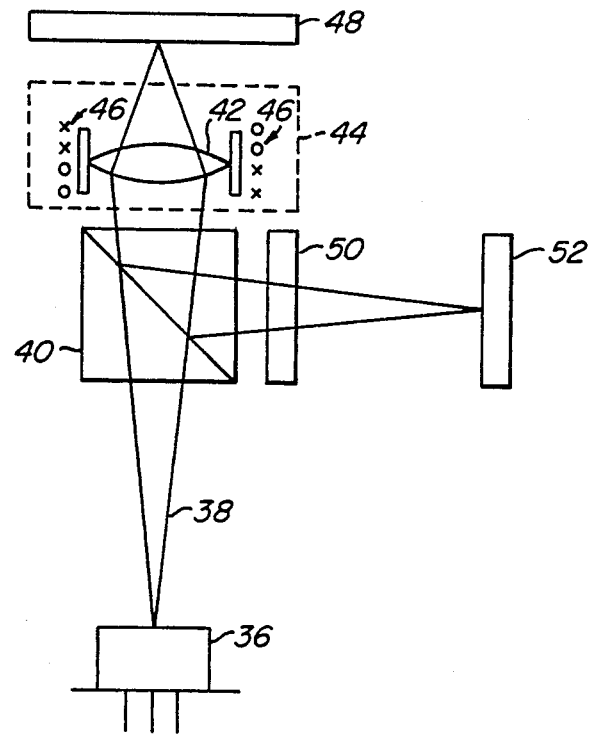
(PRIOR ART) FIG._2.
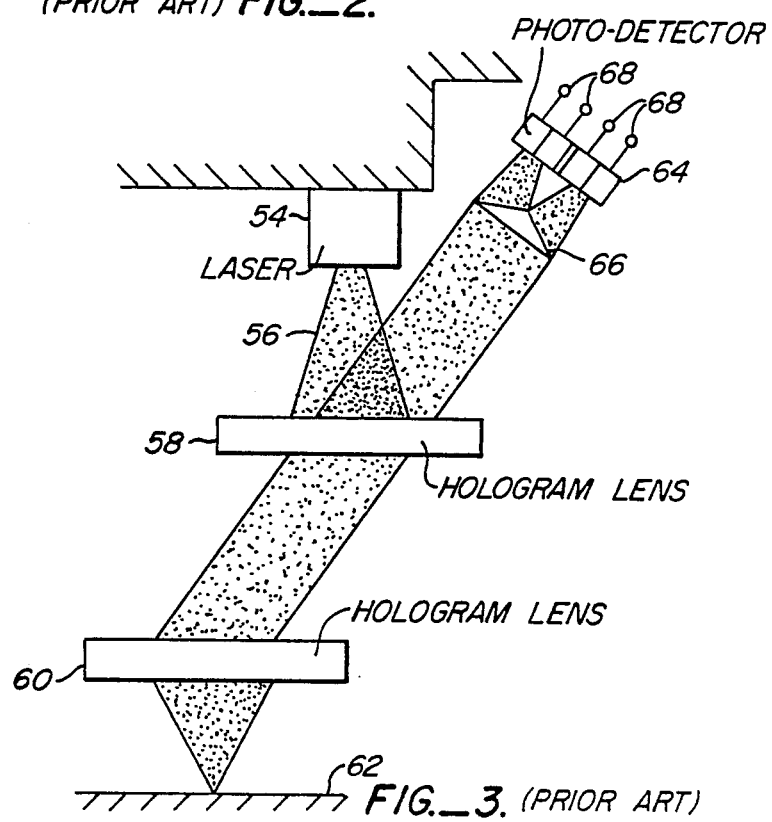
FIG._3. (PRIOR ART)

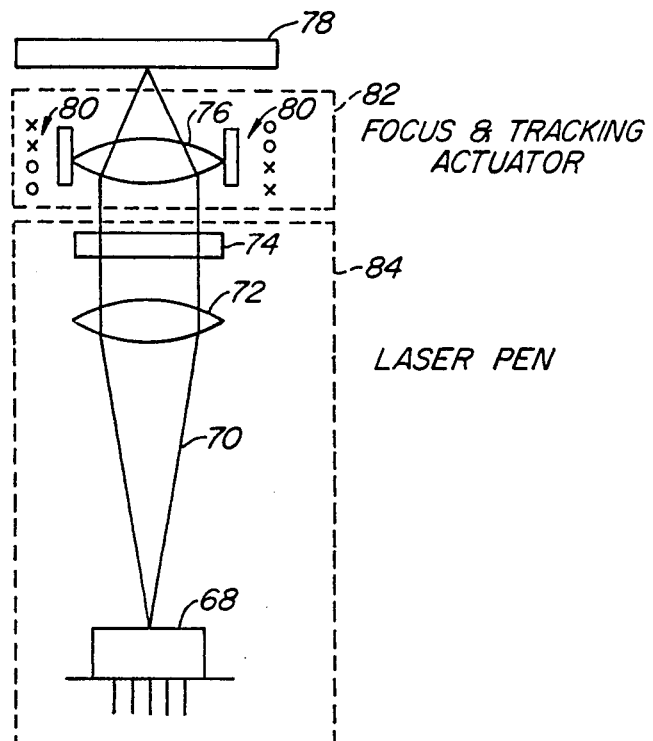
FIG._4.
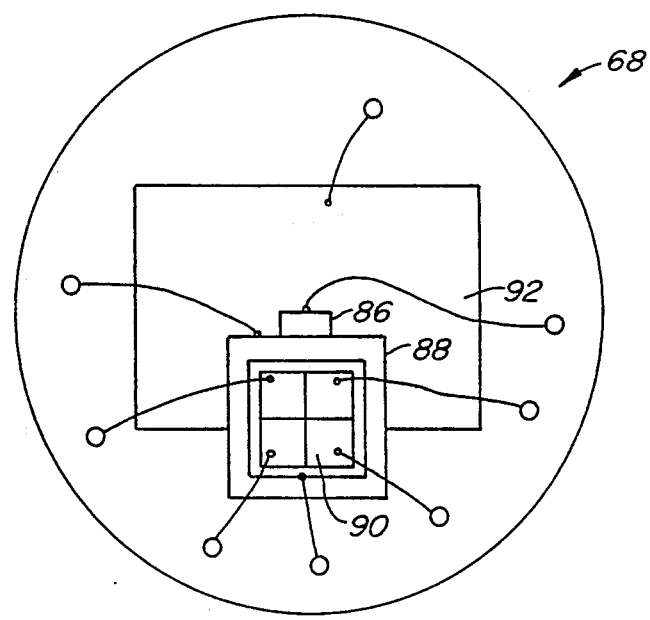
FIG._5.

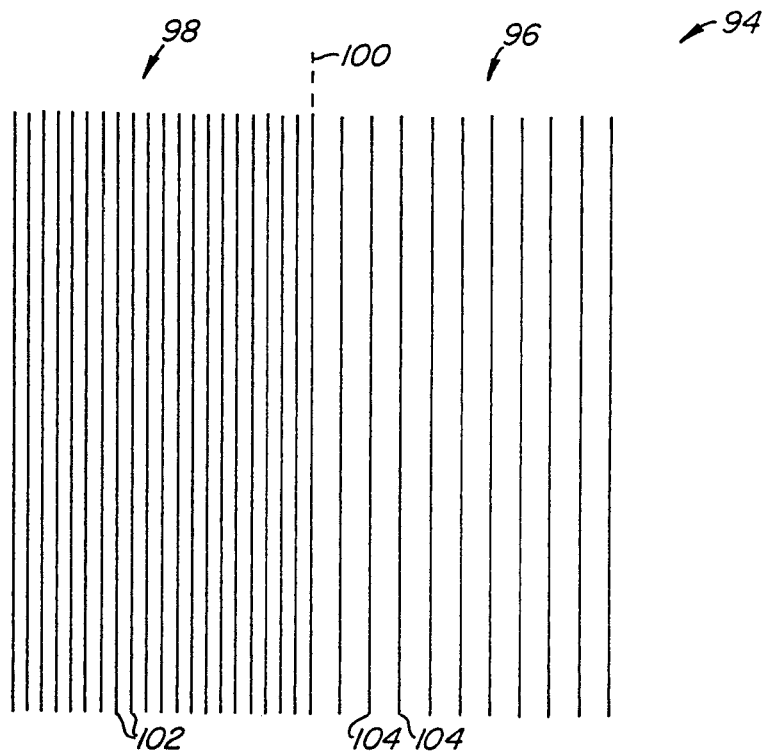
FIG._6.
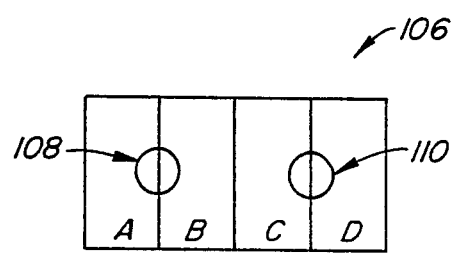
FIG._7.
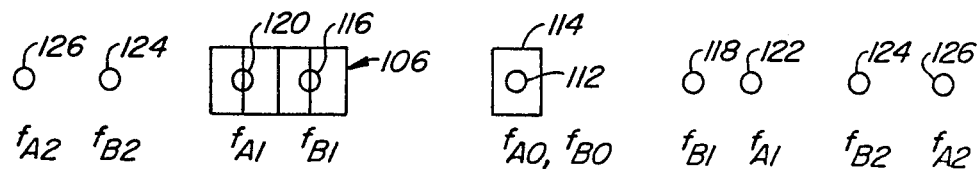
FIG._7A.

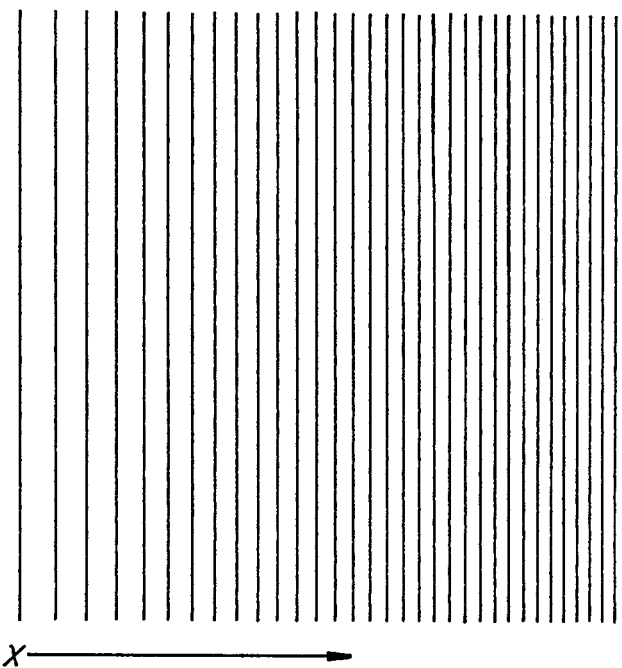
FIG._8.
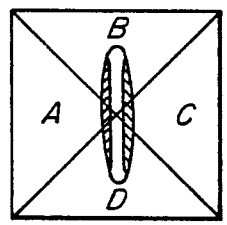 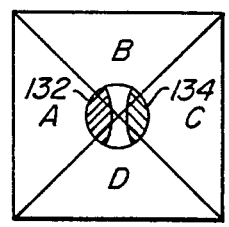 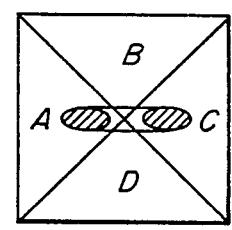
FIG._9A.  FIG._9B.  FIG._9C.

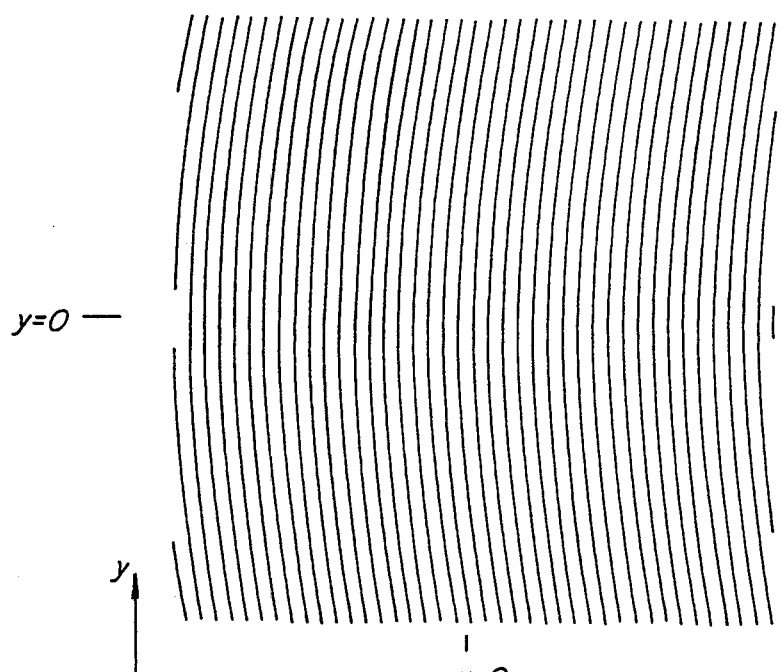
FIG._10.
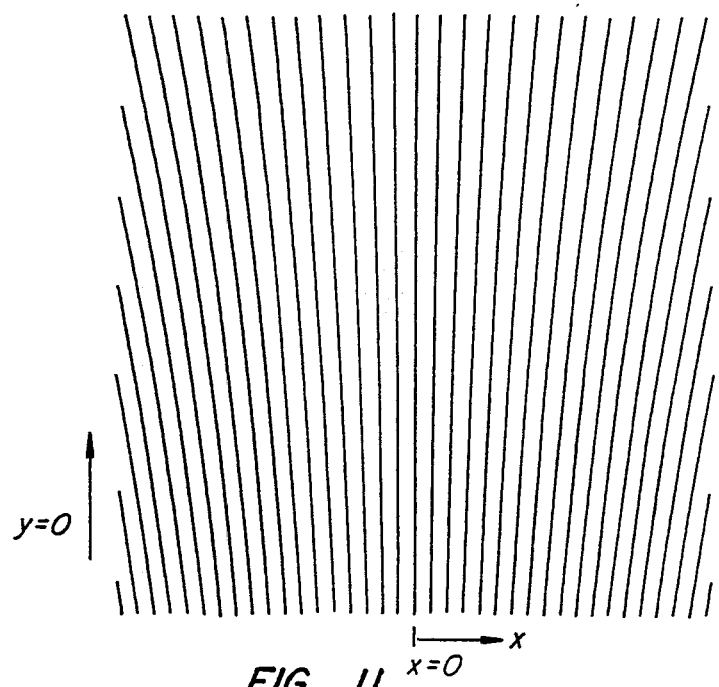
FIG._11.

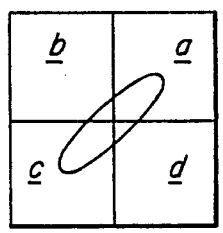
FIG._12A.
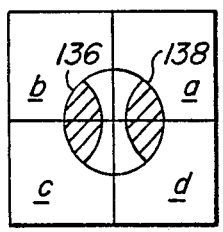
FIG._12B.
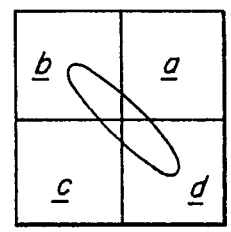
FIG._12C.
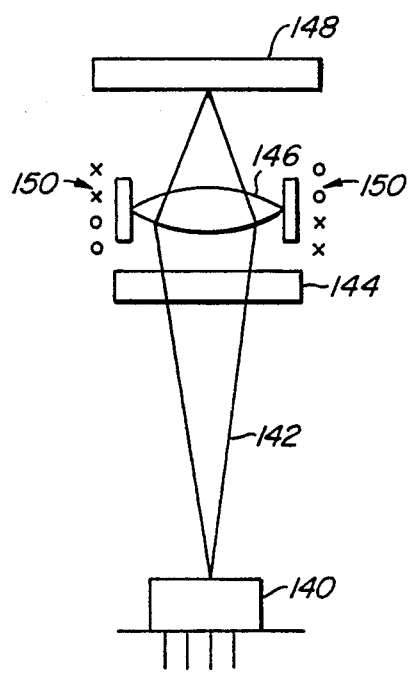
FIG._13.
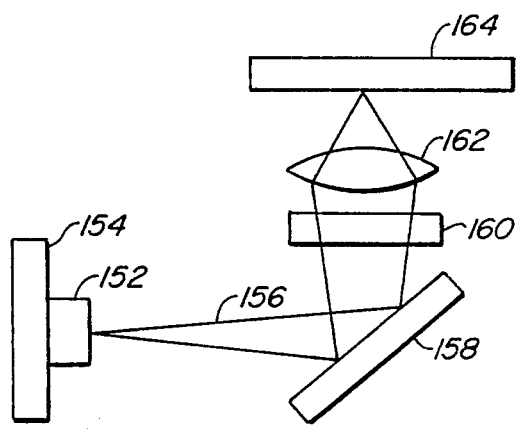
FIG._14.

OPTICAL HEAD USING HOLOGRAM LENS FOR BOTH BEAM SPLITTING AND FOCUS ERROR DETECTION FUNCTIONS

BACKGROUND

The present invention relates to optical heads for use in data recording and retrieval systems.

Optical heads produce a focused beam of light on a medium containing information and detect the light reflected from the medium to determine the information content of the medium. Mechanisms for maintaining the focus and tracking of the optical head are required. With the recent advances in semiconducter lasers, there has been an increasing use of these lasers in data retrieval and recording systems. The compact audio disc player is a significant example of how lasers are used in playing back prerecorded music, which is a form of information. The concept of the compact audio disc player or the long play video disc player can be applied to the storage of data for a large computer network, mini computers or even personal computers.

When lasers are employed in these devices, the light emitted by the lasers must be controlled by appropriate optical components to produce a very small spot of light on the medium surface. Light reflected off of the medium is projected back to a detector from which recorded information and other signals relating to the status of the focus and tracking can be derived. Some examples of patents covering optical systems for such applications are U.S. Pat. Nos. 4,486,791, 4,193,091, 4,135,083, 4,034,403, 3,969,573, 4,057,833, 3,962,720, West German Pat. No. 2501124 and U.S. Pat. No. 4,198,657.

In some compact disc players the optical unit is separated into two parts. The first part contains a laser and a collimating lens to produce a nearly collimated (parallel) laser beam. It also contains a beam-splitter to direct the return light reflected off the medium to a detector reading the recorded information. The second part contains a focusing objective lens and a mechanism for moving it up and down so that the focus spot is maintained on the medium surface.

In another version of these devices, a laser beam from the laser diode is directly imaged onto the medium by an objective lens without the use of a collimater. In the return path, the light is imaged on a detector by a beam-splitter.

FIG. 1 shows one embodiment of a prior art optical read head for a compact disc player. The head consists of a laser pen 10 and a focusing and tracking actuator 12. The laser beam is focused on an information medium 14 at a spot 16. A laser beam 18 in the shape of an elliptical cone is emitted from the semiconductor laser diode 20. Laser beam 18 passes unchanged through a beam-splitter 22 to a collimating lens 24. Collimating lens 24 produces a substantially parallel beam of light 26 which impinges upon an objective lens 28. Objective lens 28 focuses beam 26 onto medium 14 at spot 16. The focusing of lens 28 is accomplished through the use of a magnetic coil 30 which moves objective lens 28 up and down with respect to medium 14. In addition, a tracking actuator 12 may move objective lens 28 radially along the direction of medium 14, which is typically a disc.

When the laser beam is returned or reflected off of medium 14, part of the beam is reflected by beam-splitter 22 and passes through a biprism or cylindrical lens 32 to a photodetector 34. Lens 32 produces a pattern on photodetector 34 which varies according to the focus of spot 16. Thus, when detector 34 detects a variation from the ideal focus, appropriate electrical signals can be supplied to coil 30 to move objective lens 28 to the correct position. This mechanism is somewhat complicated and requires a large number of elements which must be precisely aligned relative to each other.

FIG. 2 illustrates another embodiment of a prior art optical head. A laser diode 36 emits a diverging laser beam 38 which passes through a beam-splitter 40 directly onto an objective lens 42. Again, lens 42 is mounted in a focusing and tracking actuator 44 which includes a coil 46. The beam impinges upon a medium 48 and a portion of the reflected beam is directed by beam-splitter 40 through biprism 50 onto photodetector 52. This embodiment eliminates the need for collimating lens 24 of FIG. 1, but requires that the laser pen and focus and tracking actuator of FIG. 1 be combined in one unit because of the need to precisely align objective lens 42 and beam-splitter 40. Thus, the embodiment of FIG. 2 cannot be produced modularly as can the embodiment of FIG. 1. In the embodiment of FIG. 1, the use of collimater lens 24 obviates the need for precise alignment of focusing and tracking actuator 12 and laser pen 10. Thus, the disadvantage of the embodiment of FIG. 2 is that in the event of a malfunction the entire unit must be repaired or re- placed.

A third prior art optical head utilizing a pair of hologram lenses is shown in FIG. 3. A hologram lens is a diffraction grating which was produced using holographic methods. A diffraction grating is a grating having a series of slits so that it diffracts light shined upon it. Light impinging on a diffraction grating will produce a series of diffracted beams at different angles from the central axis of the impinging light beam. The value of the angles of diffraction depend upon the wavelength of the light and the spacing of the grating. Diffraction gratings can be created mechanically, but there is a limit to the size of the spacing that can be achieved. A hologram lens is a diffraction grating created by the use of two interfering coherent laser beams in such a manner that the beams form a suitable angle relative to each other and a diffraction grating corresponding to the resulting interference pattern is formed. This interference pattern is projected onto a substrate, such as glass coated with photoresist. Upon development of the photoresist, unexposed areas (negative photoresist) or exposed areas (positive photoresist) are removed, leaving a number of parallel grooves. Vacuum deposition of a suitable metal on the grooves provides diffraction grating of the reflection type, comprising a number of equidistant parallel lines. A discussion of the formation of a hologram lens according to various techniques is set forth in U.S. Pat. No. 4,560,249.

The optical head of FIG. 3 uses a laser diode 54 to emit a laser beam 56. Laser beam 56 impinges upon a hologram lens 58, and one of the diffracted beams from hologram lens 58 impinges upon hologram lens 60. The diffracted beam from lens 58 to lens 60 is a parallel beam of light, and thus hologram lens 58 replaces the collimating lens of FIG. 1. This beam hits hologram lens 60 at an angle, causing hologram lens 60 to emit a focused beam onto a medium 62. Thus, hologram lens 60 replaces objective lens of FIGS. 1 and 2. On the return path, the undiffracted beam of light passing through hologram lens 58 impinges upon a photodetector 64 after passing through a biprism or wedge 66. Photodetector 64 includes four separate photodetectors 68. Biprism 66 splits the laser beam to create two focused beams of light which fall on different ones of detectors 68. A change in focus will cause these beams of light to move from one of detectors 68 to another, thereby enabling the detection of an out-of-focus condition. The apparatus of FIG. 3 is disclosed in U.S. Pat. No. 4,458,980.

An alternative to a biprism lens is a cylindrical lens which is polished with two separate curvatures to produce an astigmatic beam. The astigmatic beam is focused on the center of a four quadrant photodetector and will be a circle when in focus. When out of focus in one direction, it will be an elliptical beam at a first angle and thus two of the photodetectors will detect more light than the other two, indicating a focus error. When out of focus in the other direction, an elliptical beam at a different angle is produced, which can also be detected.

In addition to correcting for focus error, or the distance from the objective lens to the medium, the optical head must also track the data. The data is typically written onto a series of concentric or spiraling grooves on a disc. The grooves are very narrow and are spaced by approximately 1.6 microns to allow the placement of pits having a size on the order of 1 micron. Data is typically stored in the form of a combination of pits and "lands," where lands are the area between the recessed pits. The pits serve to scatter the laser beam while the lands reflect it. A change in the amount of reflected light indicates a transition from a pit to a land. Often, it is these transitions which are used to represent bits of data rather than the pits and lands themselves.

Because the thin groove which the pits and lands are centered on is separated from other grooves by a distance of the same order of magnitude as the laser beam diameter, a diffraction effect is produced on the beam reflected back to the detector. This diffraction effect produces three beams which partially overlap. If the beam moves off the groove to the area between grooves, interferences of the overlapping beams causes the right and left half of the pattern to alternate in brightness. By using multiple photodetectors, this change in brightness can be monitored to detect tracking errors and produce a feedback signal to put the beam back on track.

Another method for tracking is the use of a diffraction grating in front of the laser to split the laser beam into three beams before it hits the medium. The center tracking beam is focused on the track with the left and right sides being on the left and right sides of the track. These three beams are reflected back and split off by a beam-splitter to a separate set of photodiodes which detect the intensity of the two weaker beams. When they are of different intensities, the error signal activates a servo mechanism that moves the optical head to correct for the error.

SUMMARY OF THE INVENTION

The present invention is an improved optical head which uses a single diffraction grating to eliminate the need for both a beam-splitter and a biprism lens. This invention allows the placement of a photodetector immediately adjacent to the semiconductor laser to reduce alignment problems and vibrational errors. A semiconductor laser is provided which produces a laser beam which impinges upon a movable objective lens. The objective lens focuses the laser beam onto an information medium. A diffraction grating, which may be holographic, is placed between the laser and the objective lens. The diffracted beams on the forward path from the laser to the objective lens are not used, but on the return path, one of the diffracted beams is focused onto a photodetector which is adjacent the semiconductor laser in substantially the same plane.

Preferably, the photodetector is a plurality of photodetectors having a center within five millimeters of the semiconductor laser. The semiconductor laser and the photodetector may be mounted on the same heat sink, thus ensuring that the photodetector will move in the same amount and direction as the laser as a result of any vibration, thus improving the accuracy of the optical head.

A collimating lens may be included, or a mirror may be used to allow the laser and photodetector to be mounted at an angle to the axis of the objective lens and the hologram lens. Focusing may be accomplished by variations in the grating pattern of the hologram lens. For instance, an astigmatic image may be produced by having the spacing increase from one side to the other of the hologram lens. A four-quadrant photodetector can then determine whether the beam is in focus and tracking by comparing the amount of light impinging on the separate quadrant detectors. Alternately, the hologram lens may have a grating with a first spacial frequency (spacing distance) on a first half of the lens and second spacial frequency on a second half of the lens. This will produce two diffraction beams, one from each side, which are both imaged on four parallel photodetectors. By monitoring the movement of the two beams among the four photodetectors, the focus and tracking of the beam can be monitored.

The present invention thus provides a simple optical head with less parts than the prior art which is less susceptible to error due to vibration than the prior art optical heads. The beam-splitter and biprism lens of the prior art are both replaced by the single hologram lens.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a diagram of a prior art optical head using a collimating lens;

FIG. 2 is a diagram of a prior art optical head without a collimating lens;

FIG. 3 is a diagram of a prior art optical head using a pair of hologram lenses;

FIG. 4 is a diagram of a preferred embodiment of the present invention;

FIG. 5 is a front plan view of the semiconductor laser and photodetector of FIG. 4;

FIG. 6 is a diagram of the grating of a hologram lens according to the present invention having different spacing on each half;

FIGS. 7 and 7A are diagrams of an image from the hologram lens of FIG. 5 projected on four parallel photodetectors according to the present invention;

FIG. 8 is a diagram of an astigmatic hologram lens having parallel, straight fringes according to the present invention;

FIGS. 9A, 9B and 9C are diagrams of three focus conditions of a laser beam from the hologram lens of FIG. 8 imposed upon a four-quadrant photodetector according to the present invention;

FIGS. 10 and 11 are diagrams of alternate configurations of astigmatic hologram lenses having parallel, curved fringes and nonparallel, curved fringes, respectively;

FIGS. 12A-12C show the pattern produced by the lens of FIG. 11 in three different focal planes;

FIG. 13 is a diagram of a second embodiment of an optical head according to the present invention without a collimating; and FIG. 14 is a diagram of an optical head according to the present invention utilizing an angled mirror.

DETAILED DESCRIPTION OF THE PREFERRED EMBODIMENTS

A first embodiment of an optical head according to the present invention is shown in FIG. 4. A semiconductor laser and detector 68 radiates a laser beam 70 to a collimating lens 72. The collimated beam passes through a hologram lens 74 to an objective lens 76. Hologram lens 74 can also be put between semiconductor laser and detector 68 and the collimating lens 72. Objective lens 76 focuses the beam onto a medium 78. Objective lens 76 can be moved by a coil 80 in a focusing and tracking actuator 82. Semiconductor laser and detector 68, collimating lens 72 and hologram lens 74 form a laser pen 84 portion of the optical head.

FIG. 5 shows a front view of the semiconductor laser and photodetector 68. A semiconductor laser 86 is mounted on a heat sink 88. A four-quadrant photodetector 90 is mounted on the face of heat sink 88. A photodetector 92 is located behind semiconductor laser 86 to measure the light emitted from the semiconductor laser. Photodetector 92 is at an angle so that it does not reflect light back into semiconductor laser 86. Four-quadrant detector 90 is preferably within 5 millimeters of semiconductor laser 86 and is in the same plane as laser 86, or preferably within 50 micrometers of the same plane. Fifty micrometers should place the detector within the depth of focus of the optical head for a numerical aperature of about 0.1 for the laser wavelengths of interest.

In operation, laser beam 70 from semiconductor laser 86 is collimated or made parallel by collimating lens 72. This collimated beam passes through hologram lens 74 to produce a zero order diffracted beam and a number of higher order diffracted beams. The zero order diffracted beam is the one which continues on the same path, and not at an angle, and is the only beam used in the forward light path of the optical head. This beam is focused on medium 78 by objective lens 76 which can be moved with coil 80.

On the return path, the beam again hits hologram lens 74 producing zero and higher order diffracted beams. The zero order beam is returned to the laser and is not used for detection. (Some prior art systems utilize the change in power of the laser due to the reflected beam to measure the intensity of the reflected beam. These systems, however, cannot do focusing and tracking in this manner.) The reflected beam on the return path also produces higher order diffracted beams from holographic lens 74. One of these higher order diffracted beams is imaged onto photodetector 90. Preferably, this is the first order diffracted beam which is diffracted by an angle of approximately 3 degrees. This structure has the advantage of having the semiconductor laser and photodetector mounted on the same mechanical structure. Thus, motion of this mechanical unit has little effect on the signals received by the optical head because the detector will move in the same amount and direction as the beam will move due to movement of the semiconductor laser.

The embodiment of FIG. 4 is modular in that laser pen 84 can be replaced separately from focusing and tracking actuator 82. In fact, the focusing and tracking actuator of FIG. 4 is the same as the focusing and tracking actuator of the prior art.

In addition to diffracting the beam of light to move it slightly so that it will impinge upon the photodetector, hologram lens 74 can also be constructed to perform a tracking and focusing function in conjunction with the photodetector. FIG. 6 illustrates one construction of holographic lens 74 which can be used in conjunction with four parallel photodetectors as shown in FIG. 7. FIG. 6 shows a portion of a hologram lens 94 having a first half 96 and a second half 98 divided by a centerline 100. The spacing between lines or stripes 102 on side 98 of hologram lens 94 is less than the spacing between lines 104 on side 96. Side 98 thus has a grating with a spacial frequency $f_A = f + \Delta f$ while side 96 has a grating with spacial frequency $f_B = f - \Delta f$. When a laser beam is directed at centerline 100, the light pattern on photodetector 106 is shown in FIG. 7. The light pattern consists of a first spot 108 and a second spot 110. Spots 108 and 110 represent the first order diffracted beam from sides 96 and 98, respectively, with the zero order beam being to the right of photodetector 106 of FIG. 7.

This diffraction pattern can be seen more clearly in FIG. 7A. The zero order beam from both the left side of the grating 98 having the spacial frequency $f_A$ and the right side of the grating 96 having the spacial frequency $f_B$ shows up as a spot 112 on laser 114. Because $f_B$ is a lower spacial frequency (larger spacings, or period) than $f_A$, its first order diffraction beams will show up on either side of the zero order beam at a closer distance to the center as spots 116, 118, respectively. Spot 116 is focused on photodetector 106. Similarly, the first order diffraction beam for side 98 at frequency $f_A$ shows up as spots 120 and 122. The second order diffraction beams produce spots 124 and 126, respectively, from the right and left sides of hologram lens 94. The zero order beam, the right side first order beam and all the high order beams are not used.

Optical detector 106 of FIG. 7 contains four separate photodetectors A, B, C and D. The focus and tracking can be monitored by comparing the signals detected by photodetectors A, B, C and D. When the distance between medium 78 and the objective lens increases beyond the focus distance, spot 108 will move from detector B to detector A, and spot 110 will move from detector C to detector D. Similarly, when medium 78 moves closer to the objective lens than the focal distance, spot 108 will move from detector A to detector B and spot 110 will move from detector D to detector C. Accordingly, the focus error signal is generated by $(A-B)+(D-C)$.

The sideways movement of the objective lens relative to the medium away from the tracking groove will be indicated by the modulation of the reflected beams. This modulation is a variation in brightness which will affect one of spots 108 or 110 before it affects the other of spots 108 or 110. Accordingly, the tracking error signal is generated by $(A+B)-(C+D)$. This signal will show any difference between the brightness of the two spots.

The detection of data is done by comparing the total brightness of the two beams for spots 108 and 110 or A+B+C+D, to a referenced threshold indicating the difference between a pit and a land.

FIG. 8 shows a linear spacial frequency grating in which the spacial frequency increases as a function of X. The position of the fringes is given by:

$$x = A \int n^{\frac{1}{2}}$$

Where
n = $N_1$, $N_1+1$, $N_1+2$, ..., $N_2$.
A = constant

The nonuniform spacing of the fringes creates an astigmatic aberration in the diffracted beams. The beam produced by this grating is shown in FIGS. 9A-9C, with FIG. 9B showing the beam in its best focus, FIG. 9A showing the beam out of focus when the medium is too close to the lens and FIG. 9C showing the beam out of focus when the medium is too far from the lens. The best focus of FIG. 9B is also called the circle of least confusion. FIG. 9B also shows overlapping beams 132 and 134 which are produced by the grating effect of the grooved structure of the medium. The beam will be on track when beams 132 and 134 are of equal brightness, thus the tracking error signal is given by A−C. The focus error signal can be determined by noting that detectors B and D receive more light than detectors A and C in the out-of-focus condition of FIG. 9A, while detectors A and C receive more light in the out-of-focus condition of FIG. 9C. Accordingly, the focus error signal is given by (A+C) −(B+D).

FIG. 10 shows another astigmatic grating which has an identical effect on a beam of light as the grating of FIG. 8. The position of the fringes of FIG. 10 is given by:

$$x = n^*T + B^*y^2$$

Where
n = 0, 1, 2, ..., N;
T is the spacing between the lines;
B is a constant; and
y is a coordinate perpendicular to x.

FIG. 11 is another version of an astigmatic grating having astigmatic focal lines oriented at 45° with respect to the axis of the grating. The position of the fringes is given by the following equation:

$$x = n^*T/(1+C^*y)$$

Where
n = −N, −N+1, ..., N−1, N;
C is a constant; and
T is the grating period (line spacing).

The light pattern produced by the diffraction grating of FIG. 11 shown in FIGS. 12A-12C, with the best focus being shown for FIG. 12B. As can be seen, the astigmatic focal lines have been rotated by 45° relative to the pattern shown in FIGS. 9A-9C. This orientation puts the tracking signal pattern of beams 136 and 138 in a better position with respect to the photodetectors. As can be seen from FIG. 9B, beam 132 was partially in detectors A, B and D with beam 134 bring partially within detectors D, B and C. In FIG. 12B, beam 136 is wholly contained within detectors B and C and beam 138 is wholly contained within detectors A and B, thereby eliminating overlap on the detectors. The tracking signal is thus given by (A+D)−(B+C). The focus error signal is given by (A+C)−(B+D).

FIG. 13 shows another embodiment of an optical head according to the present invention in which a collimating lens has been eliminated. A laser diode and detector 140 produces a laser beam 142 which passes through a hologram lens 144 and an objective lens 146. The beam is imaged by objective lens 146 onto a medium 148. On the return path, the reflected beam has one of its first order diffraction beams imaged on the detector portion of the laser diode and detector 140. An actuator 150 is used to move objective lens 146 in response to focus and tracking error signals. This embodiment represents a trade-off between the modularity of the embodiment of FIG. 4 and the elimination of the need for a collimating lens.

FIG. 14 shows another embodiment of an optical head according to the present invention. A laser diode and detector 152 is mounted on a moving mechanism 154. A laser beam 156 is reflected off of a mirror 158 which is at a 45° angle relative to laser diode and detector 152. The beam passes through a hologram lens 160 to an objective lens 162 which focuses the beam on a medium 164. On the return path, hologram lens 160 produces a first order diffracted beam which is reflected off mirror 158 and impinges upon the detector portion of laser diode and detector 152. This embodiment allows focusing to be done by moving objective lens 162 closer to or farther from medium 164. Tracking errors can be corrected by moving laser diode and detector 152 sideways. Alternately, mechanism 154 can move laser diode and detector 152 towards or away from mirror 158 to perform focus correction, while objective lens 162 can be moved sideways to perform tracking error corrections.

As will be understood by those familiar with the art, the present invention may be embodied in other specific forms without departing from the spirit or essential characteristics thereof. For example, a different pattern could be embodied on the hologram lens to produce an image for focus and tracking error detection. Accordingly, the disclosure of the preferred embodiments of the invention is intended to be illustrative, but not limiting, of the scope of the invention which is set forth in the following claims.

What is claimed is:

1. An optical head for reading information recorded on a reflective medium, comprising:
   semiconductor laser means for radiating a laser beam;
   a diffraction grating disposed between said laser means and said medium to produce a diffracted beam from a reflected beam of said laser beam off said medium, said diffracted beam having an optical axis inclined relative to an optical axis of said reflected beam, said diffractive grating being patterned to produce a spacial variation in said diffracted beam responsive to variations in the focus of said laser beam on said medium; and
   photodetector means for detecting said spacial variations in said diffracted beam, said photodetector means being positioned to intercept said diffracted beam.

2. The optical head of claim 1 wherein said diffraction grating comprises a hologram lens.

3. The optical head of claim 1 wherein said photodetector means comprises four independently readable photodetectors.

4. The optical head of claim 1 wherein an edge of said photodetector means is within approximately five millimeters of an edge of said laser means.

5. The optical head of claim 1 further comprising a collimating lens disposed between said laser means and said diffraction grating.

6. The optical head of claim 1 further comprising an objective lens for focusing said laser beam onto said medium, wherein said laser means, said diffraction grating and said objective lens are aligned along a single axis.

7. The optical head of claim 6 wherein said objective lens is movable only along said axis.

8. The optical head of claim 1 further comprising an objective lens for focusing said laser beam onto said medium, wherein said objective lens and said diffraction grating are aligned along a single axis, said laser means being aligned at an angle to said axis, and further comprising a mirror for reflecting said laser beam from said laser means to said objective lens and for reflecting said diffracted beam from said diffraction grating to said photodetector means.

9. An optical head for reading information recorded on a reflective medium, comprising:
   semiconductor laser means fo radiating a laser beam;
   a diffraction grating disposed between said laser means and said medium to produce a diffracted beam from a reflected beam of said laser beam off said medium, said diffracted beam having an optical axis inclined relative to an optical axis of said reflected beam, said diffraction grating having a plurality of lines arranged to produce an astigmatic image from said diffracted beam; and
   photodetector means for detecting said diffracted beam, said photodetector means being positioned to intercept said diffracted beam, said photodetector means comprising four independently readable photodetectors, each of said photodetectors being disposed in a separate quadrant.

10. An optical head for reading information recorded on a reflective medium, comprising;
    semiconductor laser means for radiating a laser beam;
    a diffraction grating disposed between said laser means and said medium to produce diffracted beams from a reflected beam of said laser beam off said medium, said diffracted beams having an optical axis inclined relative to an optical axis of said reflected beam, a spacing of lines in said grating being a first value on a first side of said grating and a second value on a second side of said grating so that first and second diffracted beams having different angles of diffraction are produced by said first and second sides, respectively; and
    photodetector means for detecting said diffracted beams, said photodetector means being positioned to intercept said diffracted beams.

11. The optical head of claim 10 wherein said photodetector means comprises four, substantially parallel, independently readable photodetectors.

12. An optical head for reading information recorded on a reflective medium, comprising:
    a semiconductor laser diode for radiating a laser beam;
    a movable objective lens for focusing said laser beam onto said medium;
    a hologram lens disposed between said laser diode and said objective lens to produce a diffracted beam from the reflected beam of said laser beam off said medium, said diffracted beam having an optical axis inclined relative to an optical axis of said reflected beam, said hologram lens having a plurality of lines arranged to produce an astigmatic image with said diffracted beam; and
    four photodetectors for detecting said diffracted beam, each of said photodetectors being located in a separate quadrant, said photodetectors being located within a vertical plane within less than approximately 50 micrometers of a vertical plane containing said laser diode and at least one of said photodiodes being within five millimeters of said laser diode.

* * * * *